Figure 1:
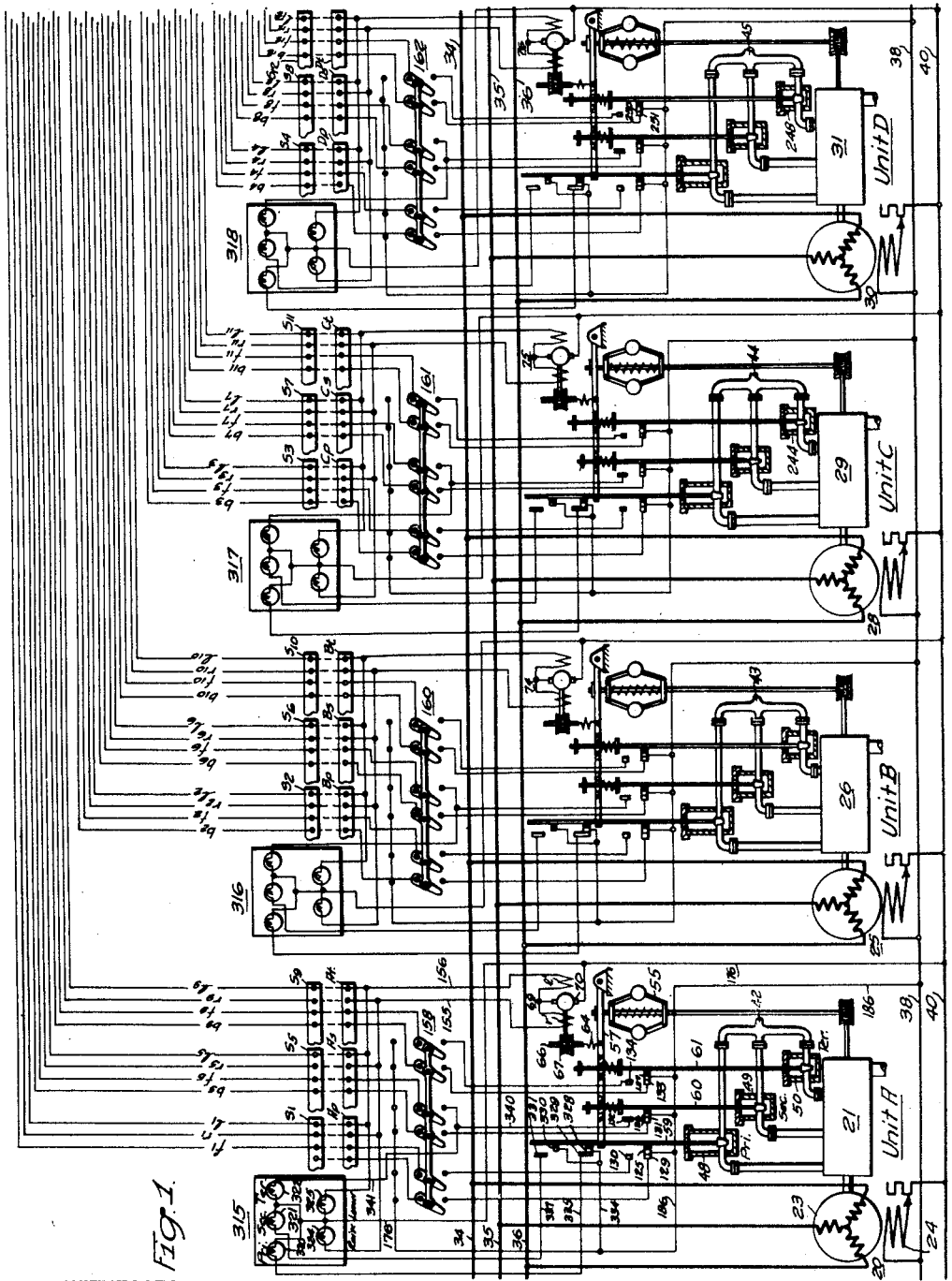

Jan. 22, 1935. A. P. HAYWARD ET AL 1,988,841

SIGNAL SYSTEM

Original Filed April 19, 1932 3 Sheets-Sheet 1

WITNESSES:

INVENTORS.
Thomas E. Purcell and
Arnold P. Hayward.
BY
Franklin E. Hardy
ATTORNEY Jan. 22, 1935.  A. P. HAYWARD ET AL  1,988,841

SIGNAL SYSTEM

Original Filed April 19, 1932  3 Sheets-Sheet 3

Characteristic Curves of a Three-Valve Turbine-Generating Unit.

WITNESSES:
E. A. M'Closkey
G. F. Bryant

INVENTORS.
Thomas E. Purcell and
Arnold P. Hayward.
BY Franklin E. Hardy
ATTORNEY Patented Jan. 22, 1935

1,988,841

UNITED STATES PATENT OFFICE 1,988,841

SIGNAL SYSTEM

Arnold P. Hayward, Bellevue, and Thomas E. Purcell, Pittsburgh, Pa.

Original application April 19, 1932, Serial No. 606,200. Divided and this application April 12, 1933, Serial No. 665,716

6 Claims. (Cl. 177—311)

Our invention relates to signal or indicating systems and it has particular relation to systems for advising a remotely located operator of the valve positions of a multi-valve fluid turbine the control of which is under supervision.

This application is a division of our copending application Serial No. 606,200 filed April 19, 1932, in which there is described a program-load control supervisory system for electrical power stations involving a plurality of generating units each of which is driven by a fluid turbine of the multi-valve type. When applied to a power system, such control equipment acts to route the load-adjusting impulses from a regulator selectively among the several generating units in a manner that total load increments are progressively taken on by individual units selected according to a predetermined program chosen to effect the most economical load distribution.

In the case of a multi-valve steam turbine or other fluid-actuated prime mover, it is highly undesirable to operate at certain points in the load range of the machine. Thus, at those load values where a control valve is open only a small amount, the heat rate becomes unduly high and the valve seat wear is excessive. While in practice such ranges may be rather narrow, the desirability of operating outside of them has long been recognized by steam turbine experts. The program-load-control system described in the copending application mentioned additionally insures that the generating units under supervision will not be permitted to continuously carry loads which cause the driving turbines to operate within these undesirable ranges.

In a control-transfer system of the type under consideration, it is customary to segregate certain portions of the control equipment in a control room which is remotely situated with respect to the generating units supervised. In order that an operator in this control room may be informed as to the valve positions of each of the turbines, particularly as to whether operation at the undesirable loadings is being effected, a signal system involving valve-position indicating means is of great utility. Likewise the operator is interested in being advised as to which particular unit in the power station the load changing impulses are being routed. Our invention is directed to a signal system which provides indications of the variety just mentioned.

Although our invention will be described in connection with a program-load control supervisory system, it will be apparent that it is also applicable to any situation in which it is desired to advise a remotely located operator of the valve positions of, and load adjusting impulses supplied to, a multi-valve steam turbine or other fluid actuated prime mover.

One object of our invention is to provide a system of indicating lamps by means of which the valve positions of a multi-valve prime mover under supervision may be communicated to an operator at a remote point.

Another object of our invention is to provide an indicating system of the type described which is capable of detecting operation of a turbine within those undesirable load ranges in which a control valve is open only a small amount.

An additional object of our invention is to provide a system of indicating lamps by means of which an operator at a remote point may be advised of the load-adjusting impulses supplied to a machine under supervision, particularly as to the direction of load change which they tend to effect.

A still further object of our invention is to provide in combination with a program-load-control system adapted to supervise the load distribution among a plurality of turbine generating units, a system of indicating lamps of the type described by means of which the operating condition of each of the multi-valve turbines may be communicated to an operator at a remote point.

In practicing our invention we associate with each of the input control valves of the prime mover an indicating lamp the energization of which is controlled by switching means actuated in accordance with the position of the valve, the lamp being caused to light only when the valve is open. To indicate the undesirable ranges of turbine loading, the indicating ranges of adjacent load-range valve lamps are caused to slightly overlap in a manner that a simultaneous illumination of two of the lamps will be effected when a turbine valve is in the undesirable slightly opened position. To indicate load adjusting impulses, a lamp is provided for energization simultaneous with that of the load-raising control circuit of the governor-adjusting means of the turbine and a second lamp is similarly associated with the load-lowering circuit thereof.

In the case of load-distribution control systems for power stations, a lamp assembly of the type just described is provided for each of the turbine-driven generating units supervised, these assemblies preferably being placed in the remotely situated control room of the station in order that an operator may, at all times, be able to determine the loading condition of each of the several units under control.

Figure 2:
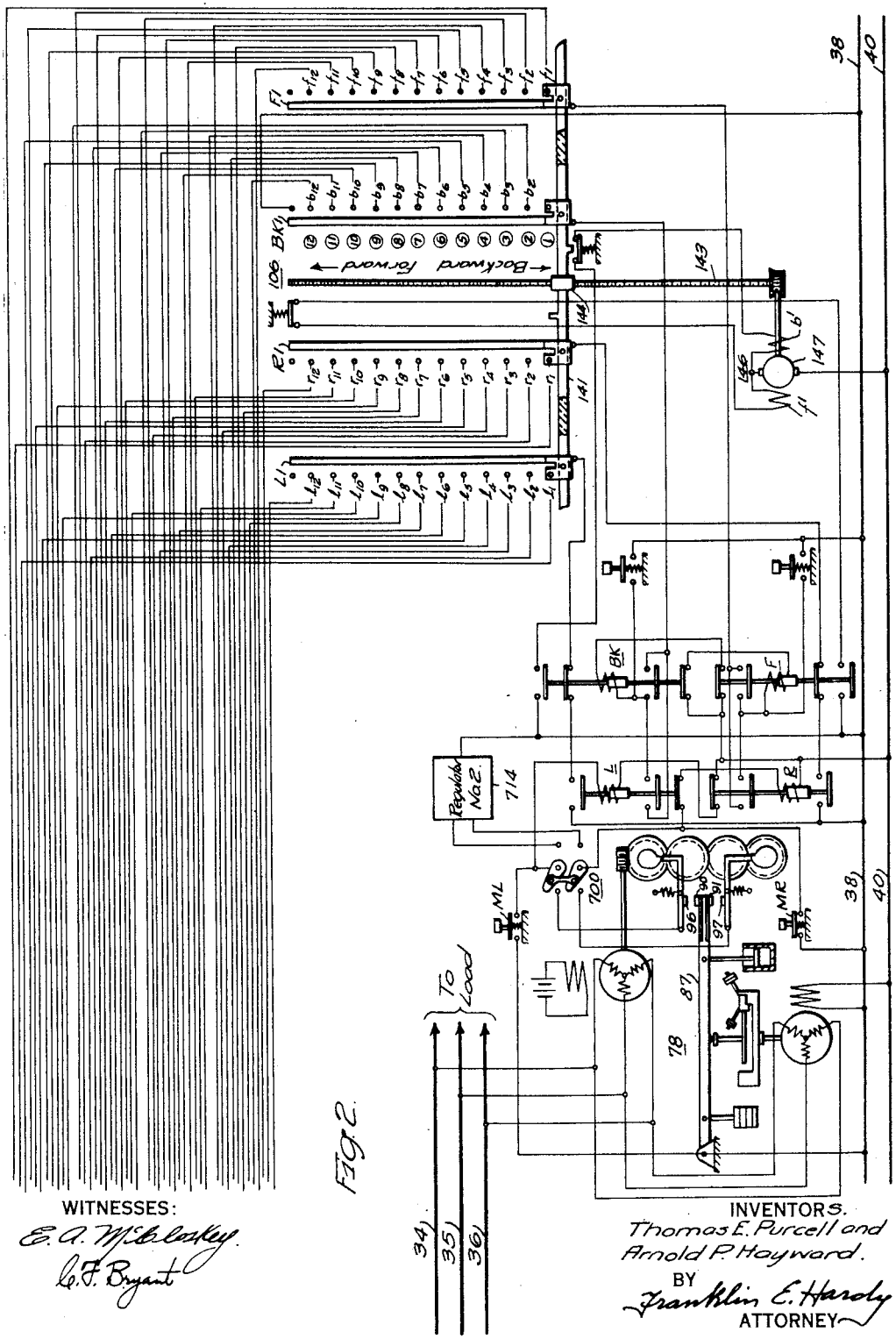
Figure 3:
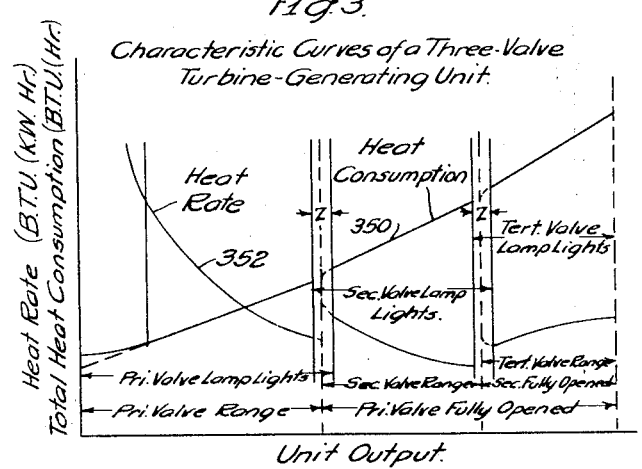
Figure 4:
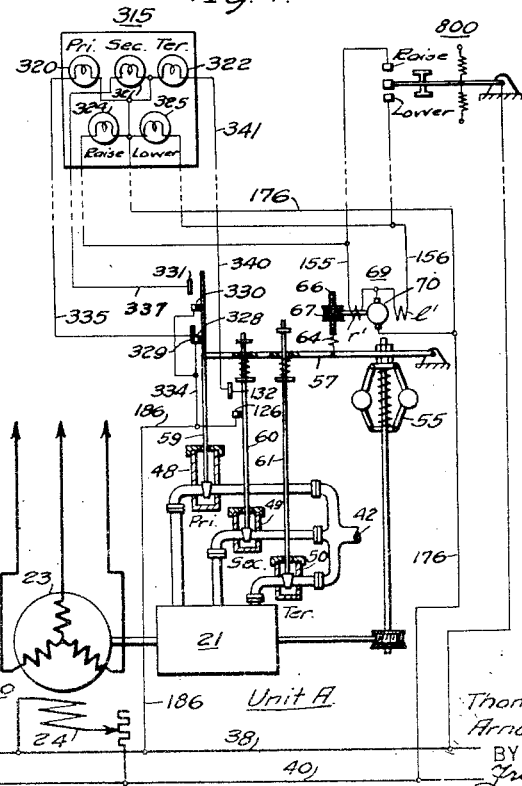

Our invention itself will best be understood through the following description of specific embodiments thereof when taken in conjunction with the accompanying drawings in which:

Figures 1 and 2, when considered together, are a diagrammatic view of apparatus and circuits arranged to constitute a program load control system for supervising four parallel-operated generating units driven by multi-valve steam turbines, the signal system of our invention being shown in Fig. 1 in association with each of the turbines, Fig. 3 is a diagram of curves illustrating the heat consumption and heat rate characteristics of a three-valve turbine of the type illustrated in Fig. 1, and Fig. 4 is a diagrammatic view of one of the turbine driven generating units showing a panel of indicating lamps associated therewith in accordance with our invention.

Figs. 1 and 2 of the drawings are exact reproductions of the corresponding figures of the drawings in the before-mentioned copending application Serial No. 606,200. These figures being completely described in that application, in the description about to follow many of the details of the program-load-control equipment which are not essential to an understanding of the signal system of our invention will be omitted.

Referring to the drawings, and particularly to Figs. 1 and 2 thereof, it will be observed that the circuit conductors terminating at the right hand side of Fig. 1 are continued at the left hand side of Fig. 2, like reference characters in the two figures designating conductors common to both and continuing from one to the other.

In Fig. 1 the four separate generating units which the program load control system is to supervise are designated generally by units A, B, C and D, respectively. Generating unit A comprises an alternating current generator 20 disposed to be driven by a prime mover 21 illustrated in the form of a steam turbine. The generator is shown as of the three-phase type, it comprising armature windings 23 and an exciting field winding 24. Similarly generating unit B comprises a generator 25 and a prime mover 26; unit C a generator 28 and a prime mover 29; and unit D a generator 30 and a prime mover 31.

The armature windings of the several generators named are connected to a three-phase power circuit designated by conductors 34, 35 and 36 at the middle of the figures. To excite the generator field windings and to energize various control circuits, a suitable source of direct current comprising conductors 38 and 40 of positive and negative polarities, respectively, is provided.

Each of the prime movers 21, 26, 29 and 31 is illustrated in the form of a steam turbine of a well known multi-valve type which is now generally applied in large capacity installations. The turbines may be supplied with driving steam through conduits 42, 43, 44 and 45, respectively, from steam boilers or other suitable source (not shown). To control the flow of this steam in the most economical manner, a plurality of control valves are inserted in each of the conduits named.

Prime mover 21, for example, utilizes a primary valve 48 which supplies one set of steam jets in the turbine, a secondary valve 49 which supplies a second set of jets and a tertiary valve 50 which supplies a third set of steam jets. In operation, both the secondary and tertiary valves remain closed until the primary valve has been completely opened, at which time the secondary valve also opens causing the second set of steam jets to aid the first in driving the turbine. When the secondary valve has been completely opened, the tertiary valve also opens and brings into action the third set of steam jets. This relation is graphically illustrated in Fig. 3.

To determine the position of the movable members of the control valves, a speed responsive governor mechanism, illustrated for prime mover 21 in the form of a fly-ball assembly 55 driven through a suitable mechanical connection by the prime mover shaft, is provided. This mechanism transmits governing movements to an arm 57 pivoted at one end and connecting at the other to the control valves by members 59, 60 and 61, respectively. An increase in the speed of the prime mover acts to move lever 57 downwardly and close the valves while a decrease in speed similarly acts to move the lever upwardly to open the valves and thus admit more steam.

Duplicate input control valves and governing mechanisms therefor are shown for each of prime movers 26, 29 and 31. It will be understood that the showing of the governing mechanisms of Fig. 1 is greatly simplified as compared with the equipment arrangement actually utilized by large capacity turbines. It is, however, believed to be sufficiently detailed to indicate the manner in which the signal system of our invention operates.

To change the setting of the prime mover governors and thereby effect corresponding adjustments in the output of the generating units, calibration-adjusting means, shown for prime mover 21 as comprising a tension spring 64 disposed to exert an upward pull upon lever 67, are provided. The magnitude of this pull is adjusted by shifting the vertical position by a spring securing member 66 illustrated in the form of a threaded rod which cooperates with the interiorly threaded gear wheel 67. Rotation of the gear wheel moves member 66 up or down to change the spring tension, an increase in tension tending to increase the speed at which governor 55 will maintain prime mover 21 and a decrease in tension causing the prime mover to correspondingly lower its speed.

To rotate gear wheel 67 a reversible motor 69 is provided. This load-adjusting motor is shown as comprising an armature winding 70 and a field winding made up of two differentially related sections $r'$ and $l'$. Energization from a direct current source of the armature through field winding $r'$ causes the motor to rotate in a direction which tends to raise the speed and output of generating unit A while energization of the motor through field winding $l'$ causes it to rotate in the reverse or speed and load-lowering direction.

Similar load adjusting motors 74, 75 and 76 are provided for the prime movers of generating units B, C and D, respectively.

To control the load adjusting motors of the generating units, any suitable means for completing one or the other of two circuits such as a frequency regulator 78 (Fig. 2) may be employed. In operation of this regulator, shown as being of a well known speed-responsive centrifugal element step-by-step operation type more completely described in copending application Serial No. 606,200, normal frequency of the voltage acting in power circuit 34—35—36 maintains a pivoted arm 87 in the intermediate or neutral position illustrated. For this position contact members 90 and 91 carried by the arm do not engage with cooperating members 96 and 97. A decrease in frequency of the circuit voltage allows arm 87 to move downwardly to a position in which member 91 engages member 97 at regularly spaced time intervals. Likewise an increase in frequency causes member 90 to be raised into engagement with member 96.

Engagement of the pairs of regulator contacts 90—96 and 91—97 respectively control the actuation of two load-control relays L and R, which, when actuated to the closed contact position by energization of their operating windings serve to energize, in the load-lowering or load-raising direction respectively, one of the load actuating motors 69, 74, 75 or 76 associated with the generating units. This is assuming that the blades of a switch 700 are closed to the left hand position so that the contacts of regulator 78 are connected with the load-control relay actuating windings. It will be appreciated however that the load adjusting impulses can also be supplied by a second regulator represented at 714, or manually through the operation of push buttons ML and MR.

In order to obtain improved efficiency in the operation of the generating units A, B, C and D as the load demand upon the main power circuit to which the four generators are connected changes, instead of permitting the regulator to simultaneously effect changes in the output of all of the generators to restore the frequency, it is desired that the regulator control be confined to only one of the regulator units and that after the output of this unit has been adjusted to a predetermined value that the control be suitably transferred to another of the units. This mode of operation is effected through the utilization of the control-transfer equipment shown as comprising a motor-driven selector switch 106 (Fig. 2) connected intermediate the generating units A, B, C and D and the load-adjusting means of which regulator 78 is representative.

Intermediate the selector switch 106 and the generating units are disposed program-selecting switching means diagrammatically illustrated in Fig. 1 in the form of twelve sequence receptacles designated by S1 to S12 inclusive, and a similar number of machine receptacles. The sequence receptacles are directly connected with the selector switch.

Each of the generating units A, B, C and D is provided with a set of three machine receptacles corresponding to the three input control valves of the prime mover, unit A for example being provided with receptacles A$p$, A$s$ and A$t$ associated with the primary, secondary and tertiary valves of turbine 21. Similarly unit B is provided with receptacles B$p$, B$s$ and B$t$; unit C with receptacles C$p$, C$s$ and C$t$ and unit D with receptacles D$p$, D$s$ and D$t$.

The sequence and machine receptacles are interconnected by removable jumper connections of any suitable type, more completely described in the copending application mentioned, such interconnections being indicated in Fig. 1 by the dotted lines between receptacles.

Initiation of control transfer operations is effected through the utilization of contact making mechanisms operated in accordance with the position of the prime mover input control valves. In the diagrammatic representation of Fig. 1, such means are shown as comprising a contact member mounted on the movable member on each input control valve of each of the prime movers. In cooperative relation with each valve-actuated contact member are two stationary contact members so positioned that they will be selectively engaged by the first named member as the valve is adjusted from the opened to the closed position. Electrical connections made from these contact members enable them to appropriately control the operation of selector switch 106.

Thus, in the case of generating unit A, contact members 125, 126 and 127 are shown as being mounted upon the movable elements of the primary, secondary and tertiary valves 48, 49 and 50, respectively. In cooperative relation with member 125 are disposed stationary contact members 129 and 130. Stationary contact members 131 and 132 are similarly disposed with respect to movable member 126 of the secondary valve when members 133 and 134 are positioned to be engaged by contact member 127 of the tertiary valve.

Similar sets of valve-actuated contact-making means are provided for generating units B, C and D, the showing being the same for all units. It will be understood that the points of equivalent contact engagement are adjustable to the valve positions at which the transfer operations will be initiated most advantageously.

The motor-driven selector switch 106 is shown as comprising four parallel operated contact establishing devices which include conducting material strips L1, R1, B$k$1 and F1, respectively. Mounted in a row parallel to each conductor strip are a plurality of stationary contact points disposed to be selectively connected with the strip by means of a movable contact making brush device. All four brush devices are carried by a bar of insulating material 141 which is mounted in a manner to permit movement along the length of the conductor strips and the associated rows of contact points.

To effect the movement of brush carrying bar 141, a switch operating motor 146 is provided. Through suitable mechanical connections the motor effects the rotation of the threaded shaft 143 which cooperates with an interiorly threaded bushing 144 carried by the bar.

The number of contact points provided for selective connection with each of the conductor strips of the selector switch is determined by the maximum number of transfer operations which it is required that the program load control equipment effect when the total load demand on all of the generating units under control changes from minimum to maximum or vice versa. Thus, in the system of Figs. 1 and 2 in which each of the four generating units has three distinct operating or load ranges, the transfer switch 106 is provided with twelve active positions designated by the row of circle enclosed numerals 1 to 12, inclusive, appearing at the left of strip F$k$1,—one position for each valve-load range of each of the four generating units.

Conductor strips L1 and R1 of the switch are utilized for the purpose of routing the load-lowering and load-raising impulses respectively of the regulator from one to another of the generating units A, B, C and D, while the other two strips B$k$1 and F1 are similarly utilized to route the load-demand-decreasing or backward and the load-demand-increasing or forward control circuits for the switch operating motor 146 among the valve actuated contacts of the generating units.

When motor 146, shown as comprising an armature winding 147 and two oppositely wound field windings $f'$ and $b'$, is energized through winding f', it rotates in the forward direction and moves the several brush members carried by bar 141 of the switch upwardly, while, when energized through winding b', it rotates in the backward direction and moves the brush members downwardly. Such energization of the motor 146 in the forward and reverse directions is respectively controlled by means of transfer-control relays F and Bk.

To the stationary contact points associated with switch element L1 are brought, through the medium of conductors $l_1$ to $l_{12}$, inclusive, the load-lowering connections from the load-adjusting motors 69, 74, 75 and 76 of the four generating units. Likewise, to the contact points associated with switch element R1 are brought, through the medium of conductors r1 to r12, inclusive, the load-raising connections from the load adjusting motors. To the stationary contact points respectively associated with selector switch conductor strips F1 and Bk1 are brought by means of conductors f1 to f12 and conductors b2 to b12, respectively, connections from the contact members associated with the prime mover valves.

Energization of the actuating windings of the transfer-control relays Bk and F is thus effected by engagement of a set of valve actuated contact members of one of the four generating units. Hence, the selector switch 106 can be operated in the forward or load-demand-increasing direction only when the proper set of contacts close in response to a prime mover valve opening adjustment, while the switch can similarly be operated in the backward or load demand decreasing direction only when the proper set of contacts is closed in response to a valve closing operation.

The load-raising and load-lowering adjusting circuits brought to the three machine receptacles of each of the generating units are paralleled and connected with the governor adjusting motor of the unit thereby permitting the motor to be energized through any one of the three receptacles. Thus in the case of generating unit A the raise and lower motor conductors shown at 155 and 156, are connected with the two points shown at the right hand end of each of the receptacles Ap, As and At.

Connections from each of the three machine receptacles to the contact members associated with corresponding turbine valves are taken, in the case of generating unit A, through a switch shown at 158, the blades of which for the purpose of the present discussion may be assumed to be closed to the downward position. It may likewise be assumed that the switches 160, 161 and 162 associated with units B, C and D are likewise closed to the downward position.

Before proceeding to a description of the signal system of our invention a brief consideration of the manner of operation of the program load control system with which it is illustrated in Figs. 1 and 2 may be had. Inasmuch as all detailed steps of this operation are completely described in copending application Serial No. 606,200, only a general description will here be given.

For the particular connections of sequence and machine receptacles indicated by the dotted lines in Fig. 1, the schedule of regulator control transfer is as follows:

Assuming that all four of the generating units are operating at minimum capacity, the frequency regulator 78 is in control of the primary valve load range of unit A. An increase in power demand acts to cause the regulator to open the primary valve of this unit. When the open position is attained a transfer operation is effected to shift the regulator control to the primary valve load range of unit B. Continued increase in load demand causes the regulator to open this valve thereby effecting a further transfer of control to the primary valve load range of unit C. When the primary valve of unit C has been opened, the regulator control is then transferred to the primary valve load range of unit D.

Opening of the primary valve of unit D effects a transfer of regulator control to the secondary valve load range of unit A. When this valve has become fully open, the control is assigned to the secondary valve load range of unit B, thence to the secondary valve load range of unit C, the secondary valve load range of unit D, the tertiary valve load range of unit A, and thence successively to the tertiary valve load ranges of units B, C and D. For the condition last named, units A, B and C are all operating at full capacity and the output of unit D is being controlled within the upper or tertiary valve range of its capacity.

A decrease in load demand on the power circuit will be seen to cause the transfer operations to take place in a sequence which is exactly the reverse of the one just stated.

For the originally assumed condition in which all of the generating units are operating at exceedingly low values of load, the selector switch 106 will be in position 1 as illustrated. The regulator 78 now being in control of generating unit A, an increase in load demand on the power circuit causes the regulator, by closure of contacts 91—97, to effect the actuation of load-control relay R. Relay R in moving to the actuated position completes a circuit for energizing load adjusting motor 69 of generating unit A in the load-raising direction. Thus energized, motor 69 adjusts the governor of prime mover 21 in a manner that the output of unit A is increased, the changed calibration of the turbine governor causing primary valve 48 to be further opened.

In a similar manner, a decrease in the load demand of the power circuit causes the regulator 78 to complete through contact members 90—96 an energizing circuit for load-control relay L. Relay L in moving to the actuated position completes a circuit for energizing the load adjusting motor of the unit A in the load-lowering direction, which tends to effect the closure of the primary valve 48 of prime mover 21.

Assuming that the load demand on the power circuit continues to increase until the primary valve of unit A is completely open, the resulting engagement of valve actuated contact members 125 and 130 initiates a control transfer operation by setting up an energizing circuit for forward transfer control relay F. The actuation of the relay, resulting from its energization, completes a forward energizing circuit for selector switch operating motor 146. Thus energized, the motor rotates to move the brush carrying arm 141 of the switch upwardly to position No. 2.

With the switch in position No. 2, load-changing impulses from the regulator are routed to governor adjusting motor 74 of unit B. Continued increase in load demand, upon causing a complete opening of the primary valve of unit B, initiates, through the closure of contact members carried by this valve, a further transfer operation which causes the selector switch to advance to position No. 3.

The remaining transfer operations in the forward or load-demand-increasing direction are effected in a similar manner. It will be noted that for each position of the selection switch the load-adjusting and transfer-initiating circuits connected thereto through a sequence receptacle whose "S" designation bears a subscript corresponding to the number of the switch position.

The transfer equipment will remain in any one of its several positions as long as the load change impulses do not cause the generating unit under regulator control to change its output beyond the limits of the range of adjustment of the input control valve to whose contacts the transfer initiation is assigned.

For switch position No. 12, in which the regulator is in control of the tertiary valve load range of generating unit D, when this valve has been advanced to the completely opened position, the full capacity of all the generating units has been brought into action. Assuming that this particular condition obtains, attention may be directed to the operations which result from a continuous change in demand in the load-decreasing direction.

A decrease in load demand which causes tertiary valve 248 of unit D to move to the closed position, initiates, by engagement of contact members 250—251, a transfer operation in the backward or load-lowering direction, the circuit set up by these contact members energizing the backward control relay B$k$. Relay B$k$, in moving to the actuated position, completes an energizing circuit for switch operating motor 146 which operates the switch in the backward direction shifting the contact member brushes to position No. 11. In this position of the switch the regulator is in control of generating unit C and transfer initiation is assigned to the tertiary valve 244 of this unit. Further decrease in load demand continuing uninterruptedly progressively effects the closure of the tertiary valves of units C, B and A, the secondary valves of units D, B, C and A and the primary valves of units D, C, B and A.

When the selector switch 106 has thus been returned to the position No. 1, the regulator is again in control of regulating unit A and the transfer initiating circuits are controlled by the primary valve 48 of this unit.

In the operations of the program load control equipment which have just been described, no attempt has been made to trace the detailed circuits involved, this information, which has no direct bearing upon the signal system of our invention, being completely available in the copending application Serial No. 606,200.

As has been mentioned in an earlier portion of this specification, the multi-input control valve prime movers of the steam turbine type present special requirements in the way of supervision in that as each additional control valve is opened there is an abrupt change in heat rate and hence in the heat consumption, which changes have a direct bearing upon the operating economy of the generating unit. The curves of Fig. 3 which are characteristics of a typical three-valve generating unit of the type shown in the system of Figs. 1 and 2 already described, illustrate graphically what these special requirements are.

The curves of Fig. 3 are representative of a well known type of steam turbine which is widely applied to large capacity installations and particularly to power generating stations. In this type of turbine the steam consumption within the secondary valve range increases faster than within the primary valve range, and the consumption within the tertiary faster than within the secondary valve range. In Fig. 3 curve 350 indicates the heat consumption of the turbine throughout its total output range while curve 352 indicates the corresponding heat rate.

As the secondary valve starts to open the consumption very rapidly rises until sufficient steam is admitted to provide driving force to the turbine. Similarly, as the tertiary valve starts to open, the heat consumption very rapidly increases until the tertiary steam jets become effective. Operation of the turbine therefore within load ranges in the immediate vicinity of the secondary and tertiary valve openings is undesirable for the reason that in addition to the high heat rate there effective, the valve seat wear is excessive due to the wire drawing action of the steam passing through the narrow orifice. These undesirable ranges are indicated in Fig. 3 by a symbol Z.

A program-load control system of the type described is capable of preventing continued operation of the generating units within these undesirable load ranges. Reconsideration of the manner of initiating control transfer operation by valve actuated contact closure, which has already been explained in connection with the program load connection of Figs. 1 and 2, reveals that by suitably adjusting the points in the valve position ranges at which these contacts engage, the generating unit may be prevented from operating within predetermined regions of valve opening.

As a means for enabling an operator at some remotely located point, as in the control room of the power station, to determine the position of the control valves of each of the generating unit prime movers, we have devised a system of indicating lamps which provides a visual indication of the valve positions and also of the load changing impulses which act upon each of the generating units. In the showing of Figs. 1 and 2, such indicating means are illustrated for generating units A, B, C and D in the form of lamp panelboards 315, 316, 317 and 318, respectively.

In each of these equipments a lamp is provided for each of the prime mover valves and arrange to light when the unit is operating in the load-range of the valve, and a lamp is also arranged to indicate the load raising and the load-lowering impulses which are received by the governor adjusting motor of the unit. The prime mover valve-load ranges for a three-valve turbine generating unit and the corresponding ranges in which it is desired that each of the valve position indicating lamps be illuminated are indicated in Fig. 3.

Considering equipment 315 for generating unit A, which is shown with greater clarity in Fig. 4, the primary, secondary and tertiary valve lamps are shown at 320, 321 and 322 respectively while the raise and lower load adjusting impulse lamps are shown at 324 and 325.

When the motor 69 of unit A is receiving a load-raising impulse, conductor 155 is energized, as reference to program-load-control system circuits will reveal and as is also indicated in Fig. 4 by simplified device 800, a positive potential so that lamp 324 connected between conductor 155 and negatively energized conductor 176 is caused to light whenever raise impulses are received by the motor. Similarly lamp 325, connected between conductor 176 and conductor 156, which is positively energized upon the occasion of load-lowering impulses, will similarly light when load-lowering impulses are impressed on motor 69.

To provide for the control of the valve position lamps two additional sets of contacts are provided for actuation in accordance with the position of the valve controlling governor arm 57. These contacts are shown for unit A as comprising members 328—329 and 330—331, respectively. As indicated in Fig. 3, it is desired that the primary valve lamp 320 light continuously during the load range of this valve and be extinguished after the secondary valve has started to open. To effect such control a lamp energizing circuit is routed through contact members 328 and 329, which are shown as being engaged when the secondary valve is closed and disengaged shortly after the secondary valve starts to open. The energizing circuit for lamp 320 may thus be traced from positive control conductor 38 through conductors 186 and 334, contact members 328 and 329, conductor 335, the lamp 320, and conductor 176 back to negative control conductor 40.

In accordance with Fig. 3 it is desired that the secondary valve lamp 321 start to light shortly before the primary valve is completely opened and remain illuminated until after the tertiary valve starts to open to thus include and extend slightly beyond both limits of the secondary valve range. To accomplish this, the set of contacts 330—331, shown as being actuated in accordance with the position of the governing arm 57, are utilized. In the position of the arm shown in which all three of the valves are closed, these contact members are disengaged. However, as the arm is raised in order to open the valves, contact member 330 engages member 331 slightly before the primary valve is completely opened and remains in engagement therewith until slightly after the secondary valve has completely opened. The energizing circuit shown for lamp 321 extends from positively energized conductor 334 through contact members 330 and 331, conductor 337, and the lamp 321 back to negatively energized conductor 176.

As is also indicated in Fig. 3, it is desired that the tertiary lamp 322 start to light just before the secondary valve is completely open and remain illuminated throughout the complete range of tertiary valve opening. To control this lamp one of the sets of contacts utilized in connection with the transfer initiation circuits for the program-load-control system, may be utilized. In the case of generating unit A, this particular set comprises contact members 126 and 132 associated with the secondary valve. As has been pointed out, these contacts come into engagement at the particular position of the secondary valve at which it is desired that a transfer operation be initiated. This position corresponds, as has been pointed out, to the point indicated in Fig. 3 just prior to the complete opening of the secondary valve.

Contact member 132 may be so disposed that engagement by member 126 will be continuous from the first contacting to the fully opened position in the tertiary valve range thus allowing the desired control of the tertiary valve lamp to be satisfactorily effected thereby. The energizing circuit shown for tertiary lamp 322 associated with the generating unit A extends from positively energized conductor 186 through contact members 126 and 132, conductors 340 and 341, and the lamp 322 back to negatively energized conductor 176.

Through the system of indicating lamps just described it is evident that a remotely situated operator can, by merely inspecting the light equipments associated with the several generating units in the system, advise himself as to the valve-load range within which each of the units is operating and also determine which of the units is being acted upon by the regulator and in what manner.

By making proper adjustments of the indicating lamp control contacts the ranges of lighting for these lamps may be adjusted to correspond to the active load ranges designated in Fig. 3. It will be observed that when so adjusted, the primary and secondary lamp ranges overlap as do the secondary and tertiary ranges. Consequently the simultaneous illumination of both primary and secondary valve lamps indicates to the operator that the generating unit is operating within the immediate vicinity of secondary valve opening which is undesirable. Simultaneous lighting of the secondary and tertiary valve lamps likewise indicates the generating unit loading to be in the immediate vicinity of the tertiary valve opening which is also undesirable. The indicating lamp equipments, therefore, are especially useful in advising an operator of improper adjustments in the loading of the generating units supervised.

Nor is the application of the signal system of our invention limited to prime movers for driving parallel operated generators, the load distribution among which is supervised by a program-load-control system. When, as shown in Fig. 4, the signal system is applied to a single multi-valve turbine 21, the governor calibration of which is disposed to be adjusted from a remote point as by the actuation of a selective contact making device 800, assuming that the operator is remotely located with respect to the turbine, he may still desire advice of the valve load range in which the turbine is operating and also have a check on whether or not the load adjusting impulses initiated by the device 800 are being properly transmitted to motor 69. The equipment 315 described in connection with generating unit A of Fig. 1 and the associated control circuits therefor, reproduced in simplified form in Fig. 4, is suitable for this application.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In combination with a program load-control system for a plurality of parallel-operated prime movers each of which has a plurality of input-control valves and means for progressively opening and closing said valves, said system including means for preventing continued operation of the prime movers within those ranges of loading where the amount of opening of a control valve being brought into or taken from action is small, a system of indicating lamps comprising for each prime mover a signal lamp for each of the control valves thereof, and means for causing each of said lamps to light from a point in advance of the fully-opened position of the valve whose opening precedes that of the valve with which the lamp is associated, through the complete range of adjustment of the lamp-associated valve, to a point beyond the initial opening point of the valve whose opening follows that of the lamp-associated valve.

2. In combination with a plurality of parallel-operated prime movers each of which has a plurality of input-control valves and means for progressive opening and closing said valves, and a load-distribution control system therefor which includes means for preventing continued operation of the prime movers within those undesirable ranges of loading where the amount of opening of a control valve being brought into or taken from action is small, a system of lamps for indicating said undesirable load ranges comprising, for each prime mover, a signal lamp each of the control valves thereof, an energizing circuit for each of said lamps, contact-making means for controlling each of said circuits, and means responsive to the position of the associated one of said valves for so actuating each of said contact-making means as to effect completion of the lamp-energizing circuit controlled thereby from a point in advance of the fully-opened position of the valve whose opening precedes that of the valve with which the controlled lamp is associated, through the complete range of adjustment of the lamp-associated valve, to a point beyond the initial opening point of the valve whose opening follows that of the lamp-associated valve, two of the lamps thus being caused to simultaneously light when operation within one of the above-defined undesirable ranges of prime mover loading is had.

3. In combination with a prime mover having a plurality of input-control valves and means for progressively opening and closing said valves, a system for indicating when the prime mover is operating within undesirable ranges of loading where the amount of opening of a control valve being brought into or taken from action is small, said system comprising a signal lamp for each of the prime mover valves, and means for causing each of said lamps to light during the complete range of adjustment of that valve and a portion of the adjacent limit values of the adjustment ranges of the two valves whose openings, respectively, precede and follow that of the given valve, two of the said lamps thus being caused to simultaneously light when the prime mover operates within each of the above-defined undesirable ranges of loading.

4. In combination with a prime mover having a pair of input-control valves and means for progressively opening and closing said valves, a system for indicating when the prime mover is operating within that undesirable range of loading where the amount of opening of the last-opening of said control valves is small, said system comprising a signal lamp for each of the prime mover valves, means for causing the lamp associated with the first-opening valve to light during the complete range of adjustment of that valve and during the small-opening portion of the adjustment range of the said second valve, and means for causing the last-opening lamp to light during the complete range of adjustment of the last-opening valve, both of said lamps thus being caused to simultaneously light when the prime mover operates within the above-defined undesirable load range.

5. In combination with a program-load control system for a plurality of parallel-operated prime movers each of which has a plurality of input-control valves and means for progressively opening and closing said valves, said system including means for preventing continued operation of the prime movers within those ranges of loading where the amount of opening of a control valve being brought into or taken from action is small, a system of indicating lamps comprising for each prime mover a signal lamp for each of the control valves thereof, and means for causing each of said lamps to light from the fully-opened position of the valve whose opening precedes that of the valve with which the lamp is associated, through the complete range of adjustment of the lamp-associated valve, to a point beyond the initial opening point of the valve whose opening follows that of the lamp-associated valve.

6. In combination with a prime mover having a plurality of input-control valves and means for progressively opening and closing said valves, a system for indicating when the prime mover is operating within undesirable ranges of loading where the amount of opening of a control valve being brought into or taken from action is small, said system comprising a signal lamp for each of the prime mover valves, and means for causing each of said lamps to light during the complete range of adjustment of that valve and a portion of the lower limit values of the adjustment range of the valve whose opening follows that of the given valve, two of said lamps thus being caused to simultaneously light when the prime mover operates within each of the above-defined undesirable ranges of loading.

ARNOLD P. HAYWARD.
THOMAS E. PURCELL.